UNITED STATES PATENT OFFICE.

FRITZ ACH, OF MANNHEIM, GERMANY, ASSIGNOR TO C. F. BOEHRINGER & SOEHNE, OF WALDHOF, GERMANY.

PARAXANTHIN AND PROCESS OF MAKING SAME.

SPECIFICATION forming part of Letters Patent No. 660,744, dated October 30, 1900.

Application filed April 16, 1898. Serial No. 677,854. (Specimens.)

*To all whom it may concern:*

Be it known that I, FRITZ ACH, a citizen of the Empire of Germany, residing at Mannheim, in the German Empire, have invented certain new and useful Improvements in the Art of Preparing Paraxanthins; and I do hereby declare the following to be a full, clear, and exact description of the invention, such as will enable others skilled in the art to which it appertains to make and use the same.

This invention relates to the art of preparing paraxanthin, a body which has been described in *Berichte der Deutschen Chemischen Gesellschaft*, Vol. 30, p. 2408.

It has been shown by Emil Fischer in *Berichte der Deutschen Chemischen Gesellschaft*, Vol. 28, p. 2481, & seq., that caffein and theobromin when treated with phosphorus-pentachlorid are partially demethylized, the demethylation being accompanied by a concurrent chlorination. When caffein is thus treated, chloro-caffein is first formed. The latter then loses two methyl groups, which in splitting off combine with chlorin to form methyl-chlorid, while the chloro-caffein is converted into 7-methyl-2-6-8-trichloro-purin, adopting the nomenclature introduced by Emil Fischer in *Berichte der Deutschen Chemischen Gesellschaft*, according to which the carbon and nitrogen atoms of the purin nucleus are numbered as follows:

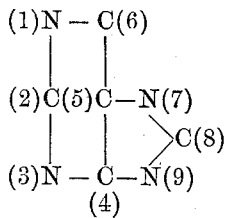

This reaction takes place according to the equation:

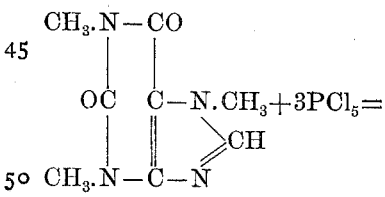

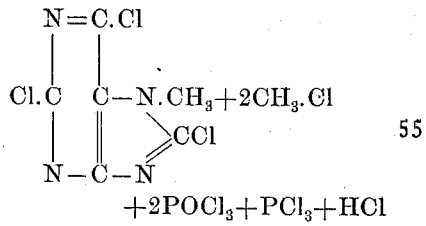

I have succeeded in causing the same reagents to react upon each other in such a way that the process takes a different course. Under my modified process it is possible to split off only one methyl group from caffein or chloro-caffein. The group so split off is the methyl group, which is bound to the nitrogen atom (3) according to the above nomenclature.

By proceeding according to my new method the new compound chloro-paraxanthin is obtained. This chloro-paraxanthin, as I have found, is readily convertible into paraxanthin by reducing agents.

Under my new method the methyl attached to the nitrogen atom (3) is not directly split off and combined with the halogen to form methyl-chlorid, as under the old methods, but there is first formed an intermediate compound having the formula $C_8H_8N_4O_2Cl_2$, due to the chlorinating action of the phosphorus-penta-chlorid upon the methyl group in the position 3, and which action takes place according to the equation:

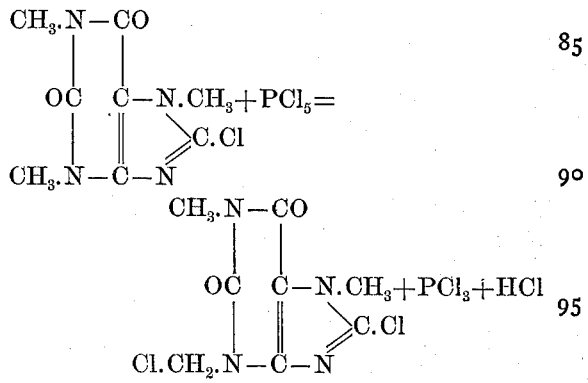

That is to say, under my present invention the phosphorus-penta-chlorid is added to the caffein in the proportion of molecule for molecule instead of in the proportions of three molecules of the penta-chlorid to one molecule of caffein, as in the aforesaid former method. In the compound so obtained, which may be termed "3'-8-dichloro-caffein," or more aptly "3-chloro-methyl-1.7-dimethyl-8-chloro-xanthin," the chlorinated methyl group in the position 3 has become very loosely bound by reason of the introduction of the chlorin atom. It may therefore be readily split off. If this dichloro-caffein is heated with water or dilute acids, it gradually goes into solution, an intense odor of formic aldehyde being concurrently developed. From such solutions the chloro-paraxanthin above alluded to may readily be isolated. This action of the water (or of dilute acids) first causes the substitution of hydroxyl for the chlorin attached to the methyl group in the position 3, according to the equation:

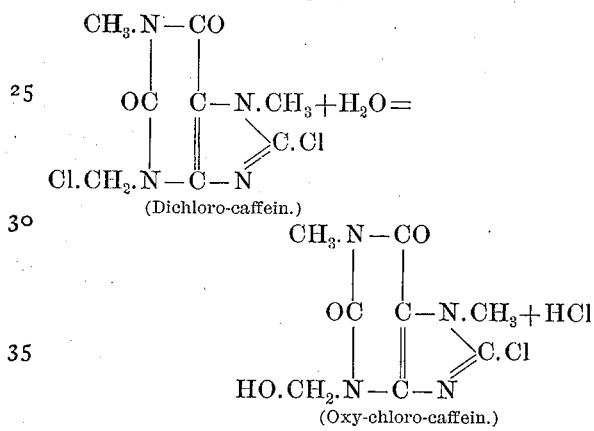
(Dichloro-caffein.)
(Oxy-chloro-caffein.)

The resultant oxy-chloro-caffein under the further action of the water is decomposed into formic aldehyde and chloro-paraxanthin according to the equation:

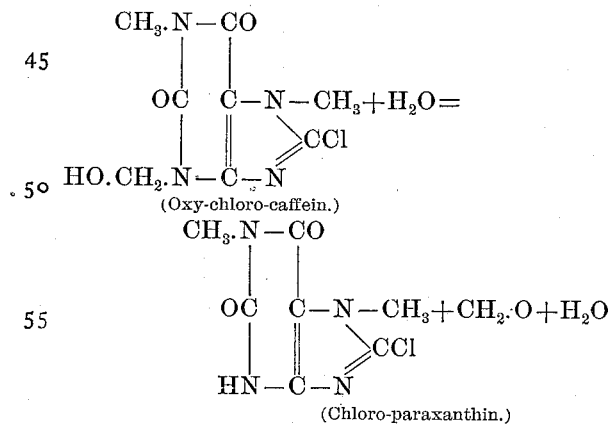
(Oxy-chloro-caffein.)
(Chloro-paraxanthin.)

As already stated, this new body chloro-paraxanthin may be readily converted into the halogen-free compound, paraxanthin, by the application of reducing methods.

I will now give a detailed description of what I consider the best manner of carrying out my invention.

*Preparation of 3'-8-dichloro-caffein.*—I take twenty-three parts, by weight, of dried chloro-caffein and heat them to from 150° to 155° centigrade in a digester, together with thirty parts, by weight, (corresponding to one and one-half molecules per molecule of chloro-caffein,) of phosphorus-penta-chlorid and one hundred parts, by volume, of phosphorus-oxy-chlorid, maintaining this temperature for from eight to nine hours. The mass is then allowed to cool, when it will be found that no more pressure exists in the vessel and that a reddish-brown solution has been formed containing colorless acicular crystals in suspension. The entire product of the reaction is then well evaporated *in vacuo*, whereby a reddish-brown resinous substance of a tough consistency will be obtained. By dissolving this product in ether and allowing it to stand for some time (about eight to fourteen days) a slightly-colored crystalline mass is obtained, which is then triturated with a little (about one-half part) cold benzene, siphoned off or decanted, and then redissolved in and recrystallized from warm ether. The new compound 3'-8-dichloro-caffein or 3-chloro-methyl-1.7-dimethyl-8-chloro-xanthin is so obtained in colorless shining well-formed crystals, whose analysis gives figures corresponding to the formula $C_8H_8N_4O_2Cl_2$. This new compound melts at 144° to 145.5° centigrade, forming a colorless liquid. With chlorin water it gives the murexid test. It is readily soluble in cold chloroform, acetone, acetic ether, benzene, and in warm ether and alcohol, but soluble with difficulty in cold water. On boiling the same with alcohol or water hydrochloric acid is split off, 3'-oxy-8-chloro-caffein or 3-oxymethylene-1.7-dimethyl-2.6-dioxy-8-chloropurin or derivatives of the same being formed.

*Preparation of chloro-paraxanthin or 1.7-dimethyl-8-chloroxanthin.*—To prepare chloro-paraxanthin, it is not necessary to employ the pure dichloro-caffein, which is obtained only with difficulty in crystalline form, but this result will be attained just as well if the above crude residue, which is obtained by evaporating the solution formed on heating the chloro-caffein with phosphorus-penta-chlorid and phosphorus-oxy-chlorid, is directly boiled with about thirty times its weight of water, the boiling being continued until the evolution of formic aldehyde has ceased. The solution is drained from the undissolved resinous residue by filtering or the like and treated with carbon for purification. It is then evaporated to one-half its bulk. After cooling, the chloro-paraxanthin is thrown out in the form of fine needles aggregated in the form of warts. These are then purified by converting them into the sodium-salt, which readily crystallizes. The sodium-salt is then redissolved in boiling water, supersaturated with dilute HCl and allowing to crystallize. Chloro-paraxanthin thus obtained is then recrystallized by redissolving in boiling water, whereby fine colorless needles are obtained whose analysis gives figures corresponding to the formula $C_7H_7N_4O_2Cl$. Chloroparaxanthin gives a strong murexid reaction with chlorin water or dilute nitric acid. It softens when rapidly heated to about 270° centigrade and melts at 281° centigrade to a colorless liquid, the melting being attended by evolution of gas. It dissolves with tolerable readiness in boiling alcohol and is moderately soluble in dilute ammonia and dilute alkalies. Concentrated alkali-lyes, particularly soda-lye, immediately form the corresponding alkali-salts, which crystallize in the form of fine shining crystals. Chloro-paraxanthin is also readily soluble in concentrated hydrochloric acid. From such a solution it is quickly precipitated by the addition of water.

*Preparation of paraxanthin.*—One part, by weight, of chloro-paraxanthin is added to five parts, by weight, of fuming hydriodic acid of the specific gravity 1.96 and heated upon the water-bath, powdered phosphonium-iodid (about one-half part) being added and frequently shaken or agitated. The heating is continued until an almost colorless solution is formed, which solution is then evaporated to dryness on the water-bath. The residue left after the evaporation is completed is the hydroiodate of paraxanthin. To completely remove the hydriodic acid, water is repeatedly added to this residue and the whole evaporated to dryness, after which the residue is dissolved with ammonia and again evaporated to dryness. If to the residue cold water is then added, the free paraxanthin remains behind. After redissolving and recrystallizing from boiling water the same is obtained in a pure state. It has all of the characteristic properties given for paraxanthin in *Berichte der Deutschen Chemischen Gesellschaft*, Vol. 30, p. 2408.

The chloro-paraxanthin and the intermediate product 3'-8-dichloro-caffein or 3-chloromethyl-8-chloro-1.7-dimethylxanthin may also be produced, if instead of the chloro-caffein caffein proper is employed as a starting product. Therefore in the generic claims hereunto annexed the term "a caffein" is used to designate both the caffein proper and chloro-caffein.

Broadly considered, my invention involves the production of paraxanthin by first converting a caffein into 3-methyl-chloro-8-chloro-1.7-dimethylxanthin and then converting the latter into 8-chloro-paraxanthin by the action of water and finally reducing the chloro-paraxanthin.

What I claim, and desire to secure by Letters Patent of the United States, is—

1. The process which consists in treating a caffein with sufficient of a phosphorus-halogen compound to form a compound differing from caffein in having a halogen atom bound to the C in position 8 and one hydrogen of the methyl group bound to the N in position 3 replaced by a halogen atom.

2. The process which consists in treating a caffein with sufficient of a phosphorus-halogen compound to form a compound differing from caffein in having a halogen atom bound to the C in position 8 and one hydrogen of the methyl group bound to the N in position 3, replaced by a halogen atom, then submitting the latter compound to the action of water.

3. The process which consists in treating a caffein with sufficient of a phosphorus-halogen compound to form a compound differing from caffein in having a halogen atom bound to the C in the position 8 and one hydrogen of the methyl group bound to the N in the position 3 replaced by a halogen atom, then submitting the latter compound to the action of water, and isolating the resultant chloro-paraxanthin, and finally, submitting the same to a reducing agent.

4. The process which consists in treating caffein with phosphorus-penta-chlorid and phosphorus-oxy-chlorid in the proportions of one molecule of the caffein to one molecule of the penta-chlorid.

5. The process which consists in heating chloro-caffein with phosphorus-penta-chlorid and phosphorus-oxy-chlorid under pressure in the proportions of one molecule of the caffein to one molecule of the penta-chlorid.

6. The process which consists in heating chloro-caffein with phosphorus-penta-chlorid and phosphorus-oxy-chlorid under pressure in the proportions, substantially as given, to the temperature and for the time, substantially as stated, then cooling and evaporating.

7. The process which consists in heating chloro-caffein with phosphorus-penta-chlorid and phosphorus-oxy-chlorid under pressure in the proportions, substantially as given, to the temperature and for the time substantially as stated, then cooling and evaporating, then dissolving the residue in ether and permitting it to stand, and, finally, triturating with benzene and drawing off the liquor and recrystallizing.

8. The process which consists in submitting 3-chloro-methyl-8-chloro-1.7-dimethylxanthin to the action of water.

9. The process which consists in treating chloro-caffein with phosphorus-penta-chlorid and phosphorus-oxy-chlorid in the proportions given, and then submitting the resultant compound to the action of water.

10. The process which consists in heating chloro-caffein with phosphorus-penta-chlorid and phosphorus-oxy-chlorid, under pressure, in the proportions and to the temperature substantially as given, then evaporating the same and then boiling the residue with water in the proportions substantially as stated until the evolution of formic-aldehyde has ceased.

11. The process which consists in heating chloro-caffein with phosphorus-penta-chlorid and phosphorus-oxy-chlorid, under pressure, in the proportions and to the temperature, substantially as given, then evaporating the same and boiling the residue with water in the proportion substantially as stated until the evolution of formic-aldehyde has ceased, then removing the liquor from the solid residue, evaporating and cooling.

12. The process which consists in heating chloro-caffein with phosphorus-penta-chlorid and phosphorus-oxy-chlorid, under pressure, in the proportions, and to the temperature, substantially as given, then evaporating the same and boiling the residue with water in the proportion substantially as stated until the evolution of formic-aldehyde has ceased, then removing the liquor from the solid residue, evaporating and cooling, then purifying by converting into the sodium-salt.

13. As a new chemical compound, a substitute xanthin having chlorin bound in the position 8 and two methyl groups in the positions 1 and 7, respectively.

14. As a new chemical compound, chloro-paraxanthin or 1.7-dimethyl-8-chloro-xanthin, which has the formula hereinabove given, and a melting-point of about 281°, centigrade, said compound crystallizing in the form of fine colorless needles, giving the murexid reaction with chlorin water or nitric acid, and being readily soluble in concentrated hydrochloric acid from which solution it is quickly precipitated by water, and is moderately soluble in boiling alcohol, in dilute alkalies, including ammonia.

15. The process of preparing paraxanthin which consists in submitting chloro-paraxanthin to the action of a reducing agent.

16. The process which consists in adding hydrochloric acid and phosphonium-iodid to chloro-paraxanthin in the proportions stated, and heating the mixture.

17. The process which consists in adding hydrochloric acid and phosphonium-iodid to chloro-paraxanthin in the proportion stated, and heating the mixture until an almost colorless solution results, then evaporating to dryness.

18. The process which consists in adding hydriodic acid and phosphonium-iodid to chloro-paraxanthin in the proportions stated and heating the mixture until an almost colorless solution results, then evaporating to dryness, then adding water and evaporating, then dissolving the residue with ammonia and again evaporating to dryness, and, finally, adding water to the residue, whereby the paraxanthin will be separated.

19. The process which consists in submitting 3-chloro-methyl-8-chloro-1.7-dimethyl-xanthin to the action of water and isolating the resultant chloro-paraxanthin and then submitting the same to a reducing agent.

In testimony whereof I affix my signature in presence of two witnesses.

FRITZ ACH.

Witnesses:
LORENS ACH,
GUSTAV HEINRICHS.